Feb. 20, 1945.   F. S. SAUNDERS   2,369,920
APPARATUS FOR TESTING SPARKING PLUGS
Filed May 18, 1943   4 Sheets-Sheet 3
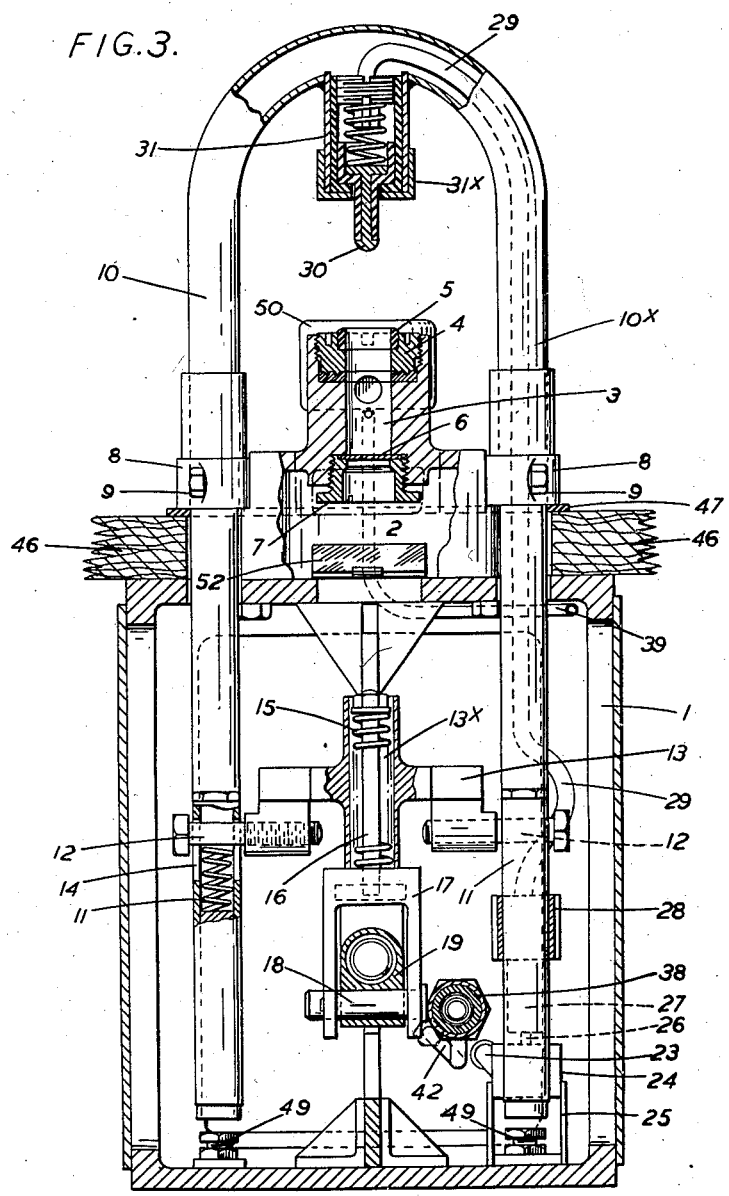
Inventor.
Frank Stanley Saunders.
By
A. Knight Conrad
Attorney.

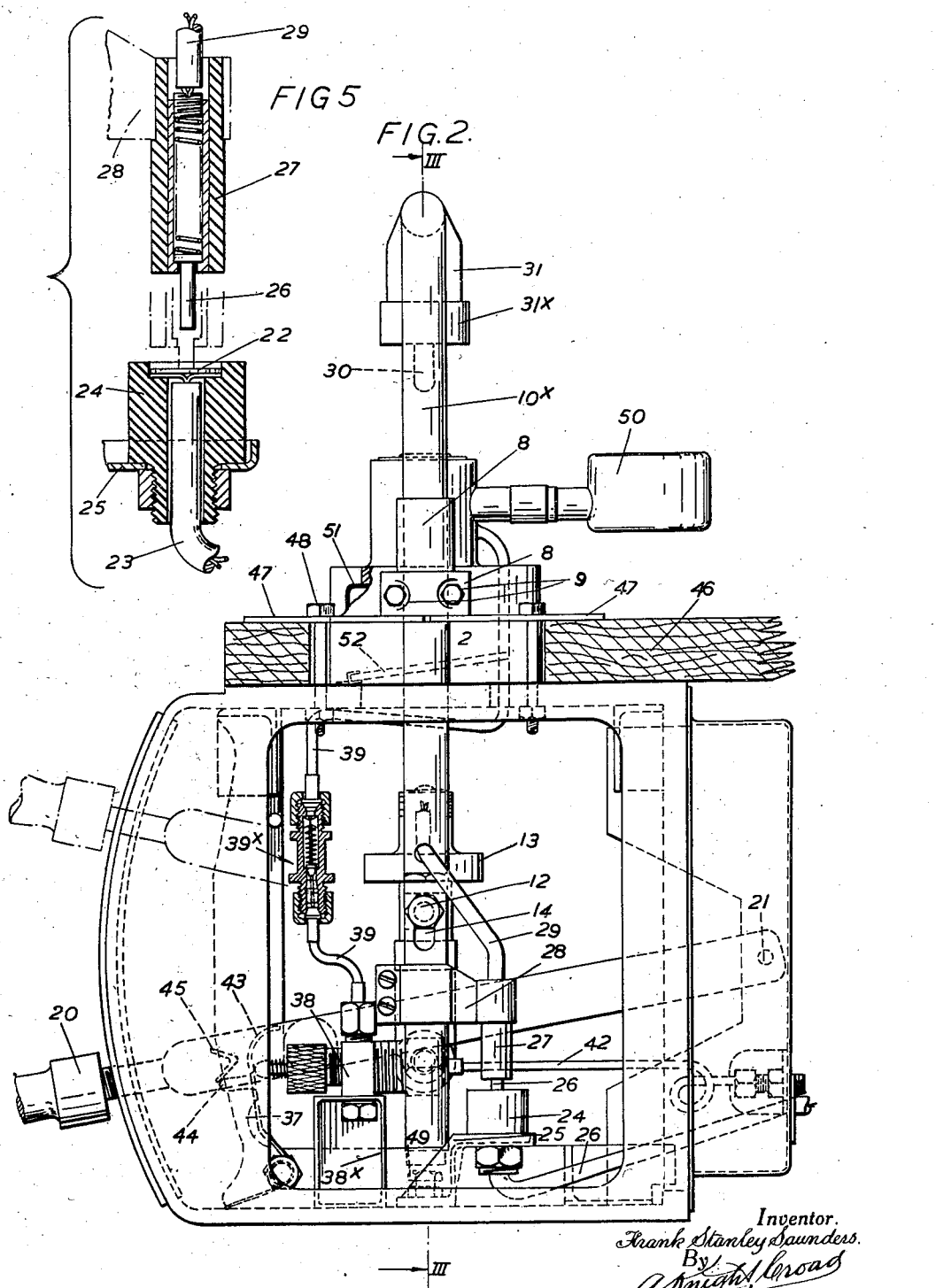

Feb. 20, 1945.  F. S. SAUNDERS  2,369,920
APPARATUS FOR TESTING SPARKING PLUGS
Filed May 18, 1943  4 Sheets-Sheet 4
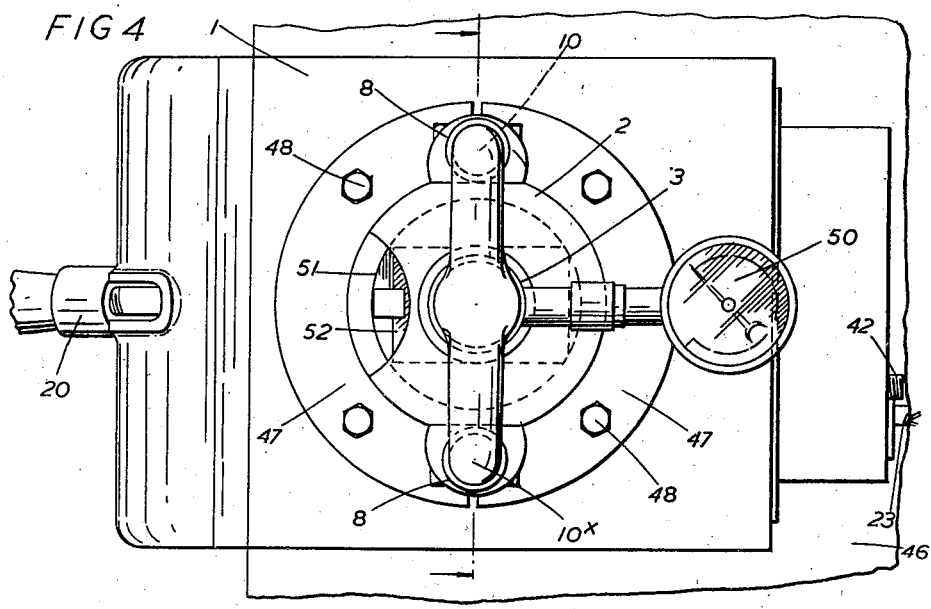
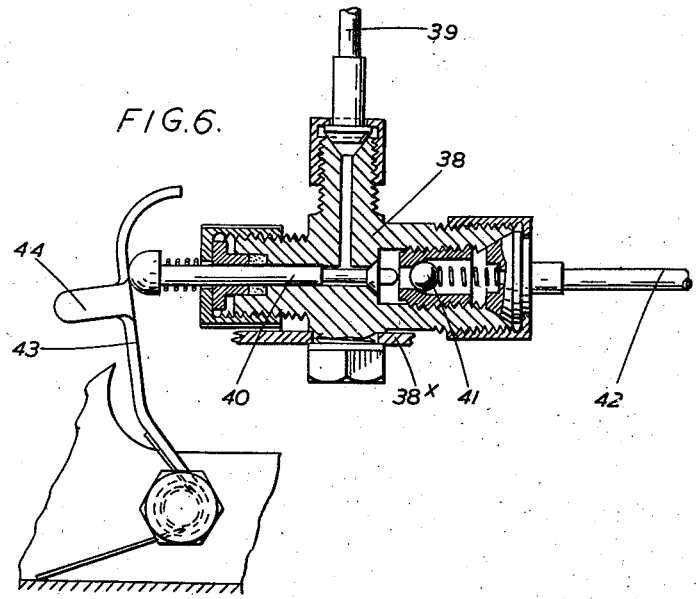
Inventor
Frank Stanley Saunders.
By
Attorney.

Patented Feb. 20, 1945

2,369,920

UNITED STATES PATENT OFFICE 2,369,920

APPARATUS FOR TESTING SPARKING PLUGS

Frank Stanley Saunders, Cardiff, South Wales

Application May 18, 1943, Serial No. 487,431
In Great Britain March 11, 1943

2 Claims. (Cl. 175—183)

This invention relates to apparatus for testing sparking plugs and is an improvement in the invention described and claimed in the specification to my prior Patent 2,244,404, and as in the aforesaid patent, has for its object the provision of a device by means of which a plug may be simultaneously tested for ignition and for pressure leakage at any of its glands, but whereas in the aforesaid invention it was only possible to test plugs of one size and type unless considerable changes were made, by the present invention it is possible to test plugs of different types and sizes by making one or two small changes.

According to this invention, that part in which the plugs are mounted for test comprises an easily removable adaptor ring furnished with an indiarubber sealing ring or washer, the housing of the contact device at the head of the apparatus is utilised to press the plugs into test position and the variation between the lengths of plugs is provided for by means of springs constituting dash pots interposed between the part carrying the contact device and the operating handle.

The apparatus illustrated in the drawings is arranged for testing what are termed screened plugs, if it is desired to test screened plugs of different sizes it is only necessary to change the removable adaptor ring, but, should it be desired to test unscreened plugs it is necessary to change the contact device at the head of the apparatus, the adaptor ring being varied according to the size of plug as above stated.

In the accompanying drawings which illustrate this invention—

Figure 2 is a similar view of the machine with the parts in the operative position.

Figure 3 is a part section on line III—III of Figure 2.

Figure 4 is a plan.

Figure 5 is a sectional view on an enlarged scale of the electric contact connected to a source of high tension current, and, Figure 6 is a sectional view on an enlarged scale of the valve controlling the supply of compressed air.

Figure 1:
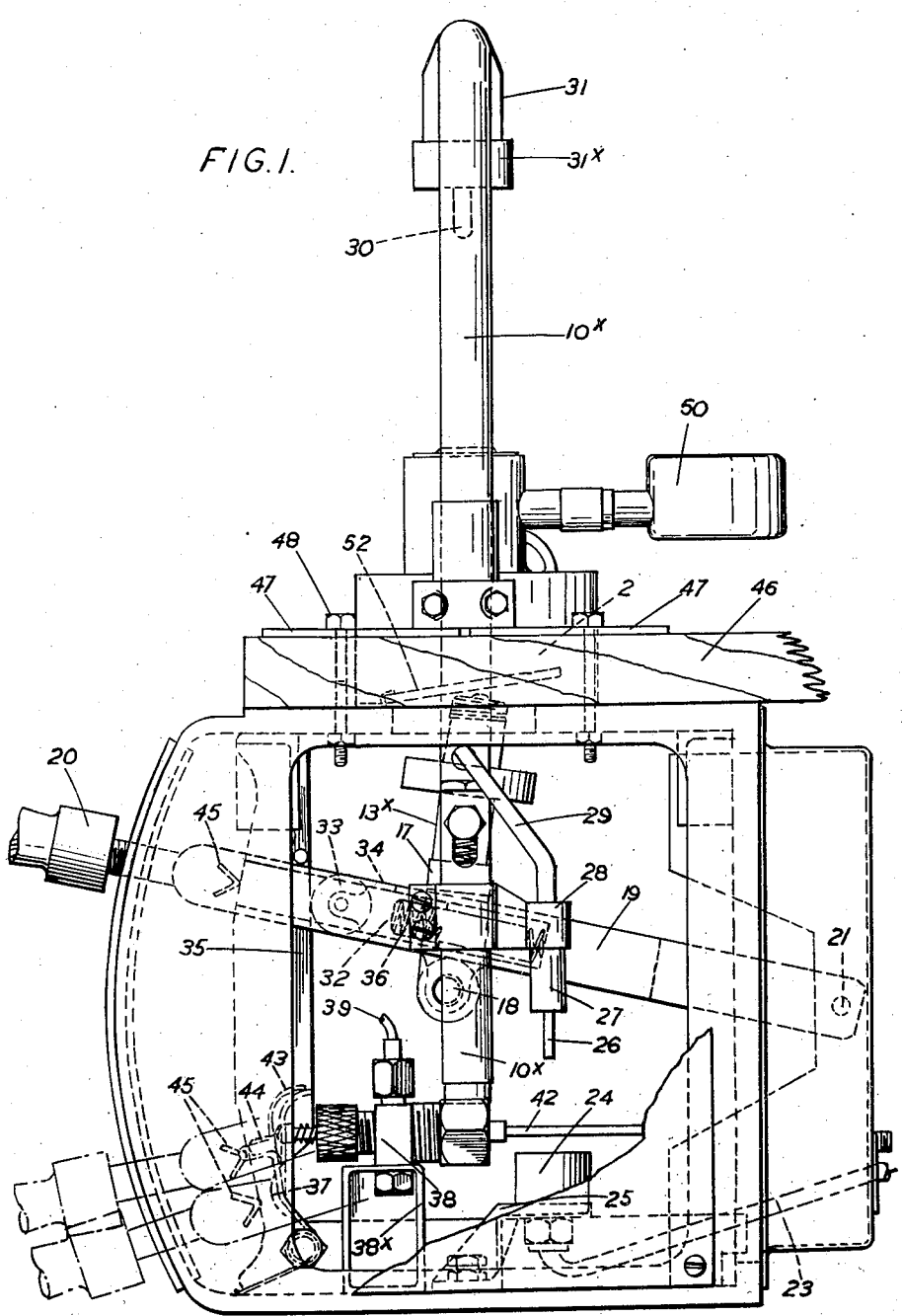
Figure 1 is a side elevation of the machine with the parts in the inoperative position.

In the embodiment illustrated in the drawings the machine comprises a box like structure 1 to the upper face of which is rigidly secured a plug holding device comprising an inspection chamber 2, a compression chamber 3, furnished at its upper end with an adaptor ring 4 supporting an indiarubber ring or washer 5, the bottom of the compression chamber is formed of a transparent material such as a circular disc 6 of plate glass maintained in position by a screw threaded element 7. The holding device is furnished on either side with two guide members 8 secured thereto by screws 9. The legs 10—10x of a vertically disposed inverted U-shaped member are slidably arranged in the guide members 8, the lower ends of said legs constitute dash pots, each leg being provided with a spring 11, the upper ends of which bear against bolts or like parts 12 forming part of a cross-head 13 connecting the legs 10—10x. The bolts 12 are arranged to slide in slots 14 provided in the tubular legs 10—10x for the purpose hereafter referred to. The cross-head 13 is itself formed as a dash pot 13x and is connected through the spring 15 and pin 16 with the saddle piece 17 pivotally mounted at 18 on the shaft 19 of the operating lever 20 the rear end of which is pivoted at 21 on the back wall of the box 1. One element 22 (Figure 5) of an electric contact device directly connected by a lead 23 to a source of high tension current such as a secondary of a magneto or induction coil is mounted in an insulating block 24 mounted on a bracket 25 secured to the base of the box 1. The coacting element of the contact device comprising a spring controlled pin 26 is mounted in an insulating member 27 secured to a clip 28 adjustably mounted on the lower part of the leg 10x, said spring controlled pin being connected by a lead 29 passing upwardly through the hollow leg 10x of the U-shaped member to a spring controlled contact device 30, adapted to make contact with the central electrode of the plug said contact device being mounted in and insulated from a part 31 depending from the centre of the arch coaxial with the holder for the plug. The operating lever 20 is of tubular formation to receive a sliding element 32 furnished with a roller 33, slidable in a slot 34, said roller being pressed against the rear face of a vertically disposed member 35 secured to the interior of the box 1 by a spring 36 acting on the sliding element 32. The member 35 is provided adjacent its lower end with a recess 37 into which the roller 33 is pressed when the operating lever 20 reaches its lowermost position. A spring controlled valve 38 mounted on a support 38x for regulating the supply of compressed air to the compression chamber 3 with which it is connected by a pipe 39, in which is located a non-return valve 39x said valve being provided for the purpose of preventing leakage of air from the compression chamber 3. The valve 38 is provided with a plunger element 40 (Figure 6) adapted to coact with a non-return ball valve 41 controlling the passage of compressed air from a source of supply through the pipe 42. The plunger element 40 is actuated by spring controlled member 43 furnished with a projecting lug 44 with which a cam member 45 on the operating lever 20 is adapted to coact.

The machine is secured to the bench board 46 by a two part clamping plate 47 and bolts 48 so that the box 1 is located below the bench board.

In operation, assuming the apparatus has been securely fixed to the bench and that the pipe 42 and lead 23 have been connected to a source of compressed air and current supply respectively, and the correct adaptor ring 4 and indiarubber ring or washer 5 (for the size of plug to be tested) fitted in position, the threaded end of a sparking plug is inserted so that the inner ends of the electrodes are downwardly directed into the combustion chamber 3. The operating lever 20 is now depressed and the contact device 30 is moved downwards, enters the screen tube of the plug, and on continued downward movement makes contact with the central electrode of the plug, and the contact pin 26 of the high tension switch comes into contact with the co-acting element 22 and current is thereby supplied to the contact device 30 and to the plug under test. The lower face of the collar 31x on the part 31 housing the contact device comes into contact with the outer end of the screen tube of the plug and forces said plug on to the sealing rubber 5 seated in the adaptor ring 4 at the head of the compression chamber 3 and further downward movement of the U-shaped member is prevented. Further downward movement of the operating lever 20 causes the two spring loaded dash pots 11 to be compressed, thus effectively sealing the plug in the chamber 3, and when the bolts 12 come up against the lower ends of the slots 14 the cam 45 is brought into contact with the lug 44 on the spring controlled member 43. Further downward movement of the operating lever 20 moves the cross-head 13 downwardly and member 43 presses the plunger 40 inwardly and opens the valve 41 and allows compressed air to pass to the compression chamber 3 through the valve 39x to the desired extent which is indicated by the pressure gauge 50. During the further downward movement of the operating lever 20 the cam 45 passes the lug 44, the valve 41 is closed and the roller 33 on the operating lever 20 is pressed by the spring 36 into the recess 37 thereby locking said lever in its lowermost position and the plug is under test, the results of which may be viewed through an aperture 51 in the wall of the inspection chamber 2, in a mirror 52 located at the bottom thereof, and any pressure leakage of air through the glands of the plug will be shown on the pressure gauge 50.

A pair of stops 49 are provided on the bottom of the casing to enable the legs 10—10x to make contact therewith should the lever 20 be moved into its lowermost position without a spark plug in position for testing in order to prevent the breaking of the high tension switch.

What I claim is:

1. Apparatus for testing sparking plugs comprising in combination a casing, an inspection chamber with superimposed compression chamber secured on the upper part of said casing, a resilient annular seat for a spark plug interchangeably mounted in the head of said compression chamber, means for pressing the plug firmly upon said seat comprising a vertically disposed U-shaped member slidably mounted in the casing, an operating handle pivotally mounted on said casing, a cross-head the ends of which engage and have a limited sliding connection with the legs of the U-shaped member, a spring in the lower part of each of said legs resisting said sliding action, a pressure element mounted on the arch of the U-shaped member adapted to co-act with the plug under test, a contact slidable in said pressure element, spring means urging said contact into a position in which it projects downwardly from said pressure element, means for establishing an electric circuit through said plug, and means for supplying a predetermined volume of air to the compression chamber, all of said means being actuated and controlled by a downward movement of the operating handle.

2. Apparatus for testing sparking plugs comprising in combination a casing enclosing the operative mechanism, a compression chamber, means for receiving and holding a plug interchangeably mounted in the head of said compression chamber, an inspection chamber mounted on the casing below the compression chamber, a pair of sleeve bearings secured to said inspection chamber, means for locking the plug in said receiving and holding means, comprising a vertically disposed U-shaped member slidably mounted in said sleeve bearings, an operating handle pivotally mounted on said casing, a dash pot device pivotally connected to said handle, a cross-head forming part of said device the ends of which engage and have a limited sliding connection with the legs of the U-shaped member, a dash pot device located in the lower part of each of said legs, an interchangeable contact device mounted on the arch of the U-shaped member adapted to co-act with the plug under test, an automatic switch device connected to a source of electrical energy, a valve connected to the compression chamber and to a source of compressed air, and means mounted on the operating handle adapted to actuate said valve and thereby control the supply of air to the compression chamber, all of said means being simultaneously actuated and controlled by the depression of the operating handle.

FRANK STANLEY SAUNDERS.